June 14, 1960 W. H. DYKENS 2,940,425
ELECTRIC CALF WEANER
Filed Sept. 17, 1958 2 Sheets-Sheet 1
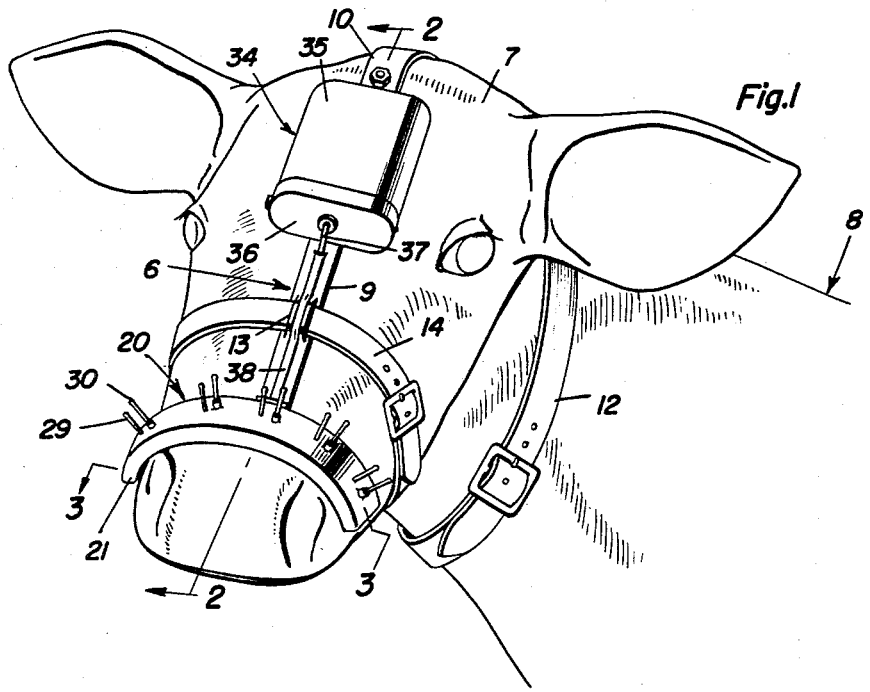
Fig.1
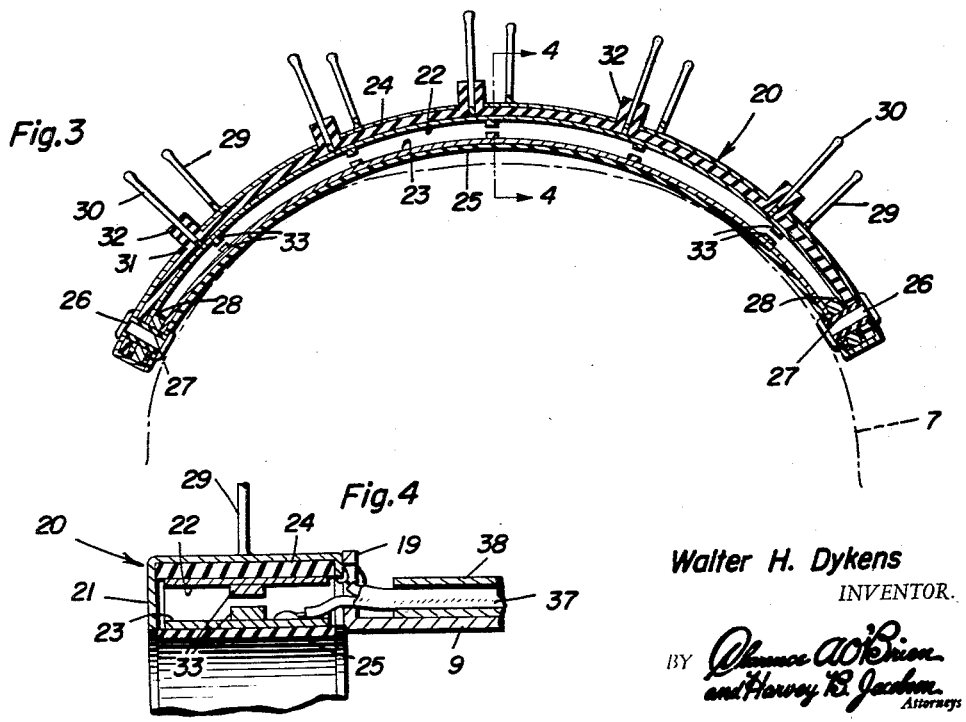
Fig.3
Fig.4
Walter H. Dykens
INVENTOR.

June 14, 1960   W. H. DYKENS   2,940,425
ELECTRIC CALF WEANER
Filed Sept. 17, 1958   2 Sheets-Sheet 2
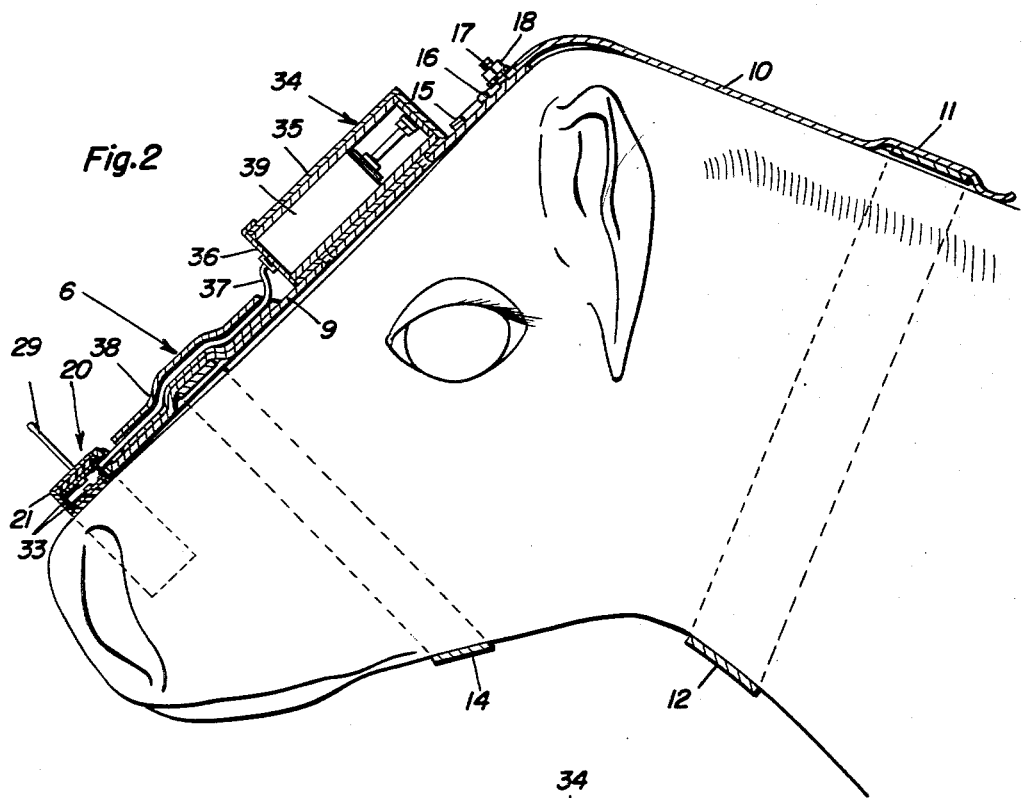
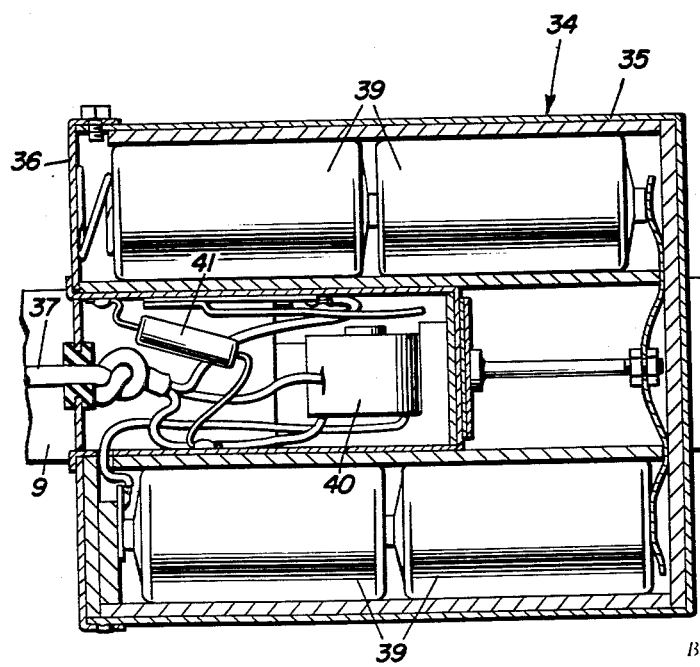
Walter H. Dykens
INVENTOR.

United States Patent Office 2,940,425
Patented June 14, 1960

2,940,425

ELECTRIC CALF WEANER

Walter H. Dykens, Rte. 3, Box 133, Joplin, Mo.

Filed Sept. 17, 1958, Ser. No. 761,595

2 Claims. (Cl. 119—130)

This invention relates to new and useful improvements in calf weaners and has for its primary object to provide, in a manner as hereinafter set forth, novel means for electrically shocking the cow and sounding an alarm, thus causing said cow to reject the calf should the latter attempt to take a teat.

Another important object of the present invention is to provide an electric weaner of the aforementioned character comprising novel means for mounting the device on the calf's head whereby the animal will be permitted to eat or graze and drink without interference.

Other objects of the invention are to provide an electric calf weaner of the character described which will be comparatively simple in construction, strong, durable, compact, of light weight, comfortable and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing an electric weaner embodying the present invention in position on a calf;

Figure 2 is a vertical sectional view on an enlarged scale, taken substantially on the line 2—2 of Figure 1;

Figure 3 is a cross-sectional view on an enlarged scale, taken substantially on the line 3—3 of Figure 1;

Figure 4 is a view on an enlarged scale in transverse section through an intermediate portion of the switch unit taken substantially on the line 4—4 of Figure 3; and Figure 5 is a horizontal sectional view on an enlarged scale through the electric power unit.

Referring now to the drawing in detail, it will be seen that the embodiment of the invention which has been illustrated comprises a bracket which is designated generally by reference character 6. The bracket 6 is for mounting on the head 7 of a calf 8. The bracket 6 includes a lower bar 9 to be mounted longitudinally on the front of the animal's head 7. Mounted on the upper end portion of the lower bar 9 is a bent or angulated upper bar 10 which extends upwardly and rearwardly over the top of the animal's head. The rear end portion of the bar 10 has struck upwardly therefrom a loop 11 through which a neckband 12 is inserted. The bar 9 has struck from its lower end portion a similar loop 13 through which a nose band 14 is inserted. Of course, the bands 12 and 14 provide means for removably securing the device in position on the animal's head. The connected end portions of the bars 9 and 10 are lapped, as shown to advantage in Figure 2 of the drawing. The bar 10 has formed therein a longitudinal slot 15 for receiving a lug 16 and a shank 17 on the bar 9 for adjustably connecting said bars. A nut 18 is threaded on the shank 17.

The lower end portion of the bar 9 has fixed thereon, as at 19, an arcuate, transverse shocking unit which is designated generally by reference character 20. The shocking unit 20 is adapted to rest on the nose of the animal and conforms substantially to the curvature thereof. The unit 20 includes an arcuate metallic housing 21 of substantially U-shaped cross-section. Mounted circumferentially in the arcuate housing 21 is a pair of spaced, concentric conductor strips 22 and 23 of suitable resilient metal. An insulating strip 24 is provided between the conductor strip 22 and the housing 21. An insulating strip 25 is provided on the outer face of the conductor strip 23 for protecting the nose of the animal. The end portions of the elements 22, 23, 24 and 25 are secured in the end portions of the housing 21 by rivets 26. Insulating sleeves or bushings 27 are provided on the rivets 26. Insulating washers 28 are provided between the end portions of the conductor strips 22 and 23, said washers encircling the bushings or sleeves 27. This is shown to advantage in Figure 3 of the drawing.

Fixed at longitudinally spaced points on the front or top of the housing 21 is a plurality of negative prods or prongs 29. Fixed at circumferentially spaced points on the resilient conductor strip 22 and projecting forwardly therefrom adjacent the negative prods 29 is a plurality of relatively long, slidable, positive prods or prongs 30. The prods 30 pass slidably through openings 31 provided therefor in the front of the housing 21 and are insulated therefrom, as indicated at 32. Reference character 33 designates pairs of opposed contacts at spaced points on the conductor strips 22 and 23.

Mounted on the bar 9 of the bracket 6 is an electric power unit 34. The unit 34 comprises a case 35 of suitable material secured on the bar 9, said case including a removable end cap or closure 36. A conductor cord 37 electrically connects the positive and negative sides of the unit 34 to the strip 23 and housing 21, respectively, of the shocking unit 20, said conductor cord passing through a conduit 38 provided therefor on the bar 9. As best seen in Figure 5 of the drawing, the unit 34 further includes a plurality of batteries 39, a vibrating coil 40, a capacitor 41, etc.

It is thought that the operation of the device will be readily apparent from a consideration of the foregoing. Briefly, the pairs of opposed contacts 33 are normally spaced from each other or open, as shown in Figure 3 of the drawing. Should the calf attempt to take a teat, one or more of the relatively long slidable prods 30 are engaged with the cow. Pressure exerted by the calf slides the prods 30 rearwardly for closing one or more of the pairs of contacts 33, thus completing the circuit and shocking the cow as the fixed prods 29 also contact said cow. In this manner the cow is caused to reject the calf. The energized coil 40 emits the usual buzzing sound which startles the calf and causes it to desist. As soon as the prods 30 are disengaged from the cow the closed contacts 33 open in an obvious manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A calf weaner comprising an arcuate metallic housing for mounting circumferentially on a calf's nose and insulated therefrom, a series of stationary, metallic negative prods fixed at circumferentially spaced points on the front of the housing and radiating therefrom for engagement with a cow, a stationary, arcuate conductor strip mounted circumferentially in the housing, an arcuate, resilient conductor strip mounted circumferentially in the housing in spaced, concentric relation to the stationary strip, said strip being electrically insulated from the housing, relatively long, metallic positive prods fixed at circumferentially spaced points on the resilient strip and projecting slidably through the front of the housing adjacent to but spaced from the negative prods and engageable with the cow for actuation thereby for engaging said resilient strip with the stationary strip, and a self-contained electric power unit having its positive and negative sides electrically connected, respectively, to the stationary strip and the housing.

2. A calf weaner comprising a bracket for mounting on the calf's head, a self-contained electric power unit on said bracket, and a shocking unit on the bracket, said shocking unit including an elongated, arcuate metallic housing electrically connected to one side of the power unit and adapted to be mounted circumferentially on the calf's nose, stationary metallic prods fixed at spaced points on the periphery of said housing and engageable with a cow, an arcuate conductor strip in the housing insulated therefrom and electrically connected to the other side of the power unit, a resilient conductor strip mounted in the housing in spaced, concentric relation to the first named strip and insulated from said housing, opposed contacts on the conductor strips, prods mounted on the resilient strip and projecting from the housing for engagement with the cow for actuation thereby for flexing said resilient strip and engaging the contacts, and a strip on the housing for insulating same from the calf.

References Cited in the file of this patent

UNITED STATES PATENTS

| | | |
|---|---|---|
| 2,263,503 | Kennedy | Nov. 18, 1941 |
| 2,510,337 | Franklin | June 6, 1950 |
| 2,602,421 | Barker | July 8, 1952 |